United States Patent [19]

Hicks et al.

[11] 4,434,084
[45] Feb. 28, 1984

[54] BASE METAL CONDUCTOR CATHODE COATING FOR TANTALUM CAPACITORS

[75] Inventors: William T. Hicks, Lewiston, N.Y.; William C. Seidel, Hockessin, Del.

[73] Assignee: E. I. Du Pont de Nemours and Company, Wilmington, Del.

[21] Appl. No.: 304,890

[22] Filed: Sep. 23, 1981

[51] Int. Cl.³ ............................................. H01B 1/02
[52] U.S. Cl. ................................. 252/512; 106/1.18; 106/218; 106/240; 106/241; 106/226; 106/227; 106/228
[58] Field of Search ............... 252/512, 518; 106/1.18, 106/218, 240, 241, 226, 227, 228; 361/433, 311, 313, 315; 29/25, 41, 570, 576 R; 427/80, 123, 385 B, 417, 405

[56] References Cited

U.S. PATENT DOCUMENTS 4,054,714 10/1977 Mastrangelo ...................... 252/512
4,353,816 10/1982 Iwasa ................................. 252/512

FOREIGN PATENT DOCUMENTS 49-9329 1/1974 Japan .
55-68489 12/1980 Japan .

Primary Examiner—Josephine Barr

[57] ABSTRACT

Cathodic coating for tantalum capacitors containing (a) a mixture of finely divided copper and tin or tin alloy particles dispersed in a solution of (b) organic acid flux, and (c) organic amine in (d) inert organic medium.

7 Claims, No Drawings

BASE METAL CONDUCTOR CATHODE COATING FOR TANTALUM CAPACITORS

BACKGROUND

Field of the Invention

This invention relates to metallizing compositions and processes and particularly to a base metal conductor cathode coating for tantalum capacitors.

Background of the Invention

In the conventional preparation of tantalum capacitors, tantalum metal powder is sintered in vacuum at a high temperature and the sintered slugs are anodized in an elecytrolytic solution to form tantalum oxide at a suitable thickness, depending on the final application voltage and capacitance density desired. These anodic slugs are then coated with a number of layers of $MnO_2$ as a conductor and also as an oxidizing agent to protect the tantalum oxide. Then the coated slugs are coated with a number of layers of graphite deposited by dipping them in aqueous suspensions of graphite with baking in between applications. The graphite-coated parts are dipped in a suspension of silver powder in an organic vehicle, for example, acrylic resin dissolved in Cellosolve ® acetate and butyl acetate. The graphite and silver coatings serve as a cathode to the capacitor. These cathode coatings are then dried in air at 150° C. to form an adherent coating of silver plus acrylic resin. The coatings are then soldered in a eutectic solder using mild fluxes. The soldered parts are usually sealed with an epoxy coating or hermetically sealed in a metal can which is in contact with the anode silver coating. The typical silver content of these air-dry compositions varies from 35 to 60% silver.

In French Pat. No. 7408542, a composition comprising copper and tin powders and resin flux was disclosed which is applied to a substrate. The substrate was then heated so that inter-metallic copper tin compounds formed around the copper particles resulting in a three-dimensional network of coated copper particles in a matrix of tin. It is stated the pastes were useful for manufacturer of printed circuits and decorative applications. It is also briefly mentioned, but not demonstrated, that such compositions may be used as less expensive replacements for silver compositions such as those used in tantalum capacitors. A broad range of metallizing compositions is disclosed comprising from 80 to 97% by weight copper- and tin-containing metal powders with from 20 to 3% by weight rosin flux.

In addition, Japanese Patent Application No. 9329/68 discloses a circuit board paint in which lead or lead alloys such as solder are coated on a metal powder, for example, silver or copper, as the conductive component of the paint.

While many copper conductor compositions have been disclosed in the prior art, none has been directed expressly and specifically to the unique problems of cathodic coatings for tantalum capacitors in which the conductor composition is coated directly upon a layer of dielectric metal oxide.

Brief Summary of the Invention

The invention is therefore directed to a metallizing composition for use as a capacitor cathode coating comprising (a) 92 to 97% by weight of a mixture of 70 to 95% weight finely divided particles of copper and 30 to 5% weight finely divided particles of tin-containing metal, dispersed in a solution of (b) 4 to 1.5% by weight of an organic acid flux having an acid number of at least 100 and which is thermally stable to a temperature of at least 230° C., (c) 4 to 1.5% by weight of an alkanol amine or alkyl amine corresponding to the formula

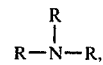

wherein R is independently selected from the group consisting of H, $C_{1-8}$ alkyl, $C_{2-4}$ alkenyl and $C_{1-4}$ hydroxyalkyl, at least one of the R groups being alkyl or hydroxyalkyl, in (d) an inert organic medium.

In a second aspect, the invention is directed to a capacitor comprising (1) a core of anodic metal coated with (2) a layer of dielectric metal oxide, the dielectric layer being coated with (3) a layer of cathodic metal, the improvement comprising using as the cathodic metal coating the above-described composition which has been heated to a temperature of at least 220° C. for a time sufficient to effect reaction of at least 50% weight of the tin with the copper metal in the coating to form the intermetallic compound $Cu_3Sn$.

In a still further aspect, the invention is directed to a process for applying the above-described metallizing composition as a cathode coating to a tantalum capacitor.

DETAILED DESCRIPTION OF THE INVENTION

A. Metal Conductive Phase

The copper particles which may be used are any of the commercially available copper powders or copper dusts. Characteristically, these available materials have high purity (usually at least 99.5%) that is desirable for good conductivity. A lesser degree of purity may be tolerated, however, particularly if the impurities are themselves conductive. In view of the high purity characteristic of the commonly available materials, purity will, as a practical matter, ordinarily not be a consideration in the selection of materials for carrying out the invention. Particle size may be from about 0.01 μm to about 40 μm, preferably from about 10 μm to about 30 μm.

The tin particles which may be used are likewise the commercially available tin powders of high purity (usually at least 99.80% pure), in particle sizes from about 0.01 μm to about 40 μm, and preferably from about 10 μm to about 30 μm. The advantages and disadvantages of the very small particle sizes parallel those already mentioned for the copper particles. Tin powders of lesser purity may be used, as may also powders of various tin alloys and mixtures of tin powder with powders of other low-melting metals. Generally, the tin should comprise at least 20%, and preferably at least 40%, of such mixtures or alloys.

The invention is also applicable, however, to tin-containing solder alloy powders such as tin/lead, tin/bismuth, and tin/silver in finely divided form. Preferred powders are those containing large amounts of tin such as eutectic compositions 62% tin, 36% lead, 2% silver; 63% tin, 37% lead. Higher tin-containing powders such as 96% tin, 4% silver are also useful.

The proportion of metals in the conductive phase should be 70-95% wt. copper and concomitantly 30-5% wt. tin or tin alloy. It is preferred, however, that the metal conductive phase contain 75-90% wt. copper and 25-10% wt. tin or tin alloy. The best mode of the invention known at the time of filing of this application contains 80% wt. copper and 20% wt. tin or tin alloy.

The conductive metals comprise 92-98% and preferably 93-95% wt. of the metallization, exclusive of the dispersing medium, the most preferred concentration of the metal phase being 94% wt.

B. Organic Acid Flux

A wide range of organic flux materials may be used in the invention so long as they have an acid number of at least 100. (By acid number is meant the number of milligrams of KOH which are required to neutralize the free acids in one gram of the acidic flux material.). In addition, they must be thermally stable to a temperature of at least 230° C., i.e., the minimum temperature at which the formation of the desired intermetallic compound takes place.

Preferred organic acid fluxes are the rosin-derived flux materials. These include rosins and modified rosins such as rosin-derived dimeric acids, modified rosin-derived dimeric acids, hydrogenated rosins, polymerized rosin, noncrystalline oxidation-resistant resin, dehydrogenated rosin, partially hydrogenated wood rosin and modified partially hydrogenated wood rosin. In addition, dibasic acid-modified rosin esters which are both alcohol- and alkali-soluble are very good for this use. A still further flux material is resinous terpine-derived polybasic acid. Materials of this type are readily available from Hercules, Inc., Wilmington, Del. Particular materials which have been found to work well are Staybelite A-1, an unsaturated abietic acid, and Pentalyn 225, a partially hydrogenated abietic acid. Staybelite and Pentalyn are tradenames for rosin-derived materials from Hercules, Inc., Wilmington, Del.

In addition to the rosin-derived materials, both saturated and unsaturated long chain fatty acids are suitable so long as they meet the above-described acid number and thermal stability criteria. Examples of suitable materials of this type include lauric, myristic, palmistic, stearic, oleic, and linoleic acids.

The organic acid flux should comprise 1.5-4.0% wt. of the metallization (excluding organic medium). From 2.5 to 3.5% wt. of the flux is preferred with an optimum of 3.0% wt. being especially preferred.

C. Organic Amine

Suitable organic amines for the invention are alkenyl and alkyl amines corresponding to the formula

wherein R is independently selected from the group consisting of H, $C_{1-8}$ alkyl, $C_{2-4}$ alkenyl and $C_{1-4}$ hydroxy alkyl, at least one of the R groups being alkyl or hydroxy alkyl. Preferred materials of this type are the monoalkyl amines such as isopropyl amine and especially polyalkanol amines such as triethanol amine.

The organic amine should also comprise 1.5-4.0% wt. of the metallization (excluding organic medium). From 2.5 to 3.5% wt. of the organic amine is preferred and 3.0% wt. amine is especially preferred.

Formulation

Unless the flux and amine materials are liquids, it will also be necessary to employ a solvent for them. The solution of flux and amine will then serve as a vehicle in which the metal particles may be dispersed. The requirements for the solvent are that it be a solvent for the flux and amine, that it be sufficiently volatile to be essentially completely removed during the heating operation, and that it leave no residue that will adversely affect the electrical integrity of the system. Typically, when the flux is rosin-derived, the solvent may be a terpene hydrocarbon or a terpene alcohol. Other solvents that may be used include other hydrocarbons and substituted (e.g., halogenated) hydrocarbons. Mixtures of solvents may also be used.

The amount of solvent used must, of course, be sufficient to dissolve the flux material. Beyond that requirement, the amount of solvent is governed primarily by the desired viscosity of the metallizing paste. In turn, this requirement will vary according to the method selected for applying the paste to the substrate. Therefore, the weight percent loading of metal powders or of metal powders and flux combined in the paste is not critical so long as the paste can be applied to the capacitor body smoothly and uniformly to give a cathodic coating with good conductivity and solderability. The highest loading possible, consistent with obtaining the desired viscosity, is desirable because it reduces heating time, leads to a more dense and compact final structure, and minimizes the possibility of voids and electrical discontinuities after drying. Typically, a metallizing paste of this invention will comprise 65-75% by weight of solids dissolved in 35-25% by weight organic medium.

The metallizing compositions of the invention may optionally include other ingredients for such purposes as altering the viscosity of the composition or enhancing the adhesion of the composition to the substrate after drying. For example, there may be incorporated resins of various kinds, such as epoxy, phenoxy, and acrylic resins, to serve as binders for the metal particles. Heat-curable resins can be incorporated in their partially cured form, or as mixtures of their starting components, so that the heating step that melts the tin and forms the intermetallic copper/tin coatings around the copper particles will also cure the resin in situ on the substrate, thereby enhancing adhesion of the pattern to the substrate. For electrical uses, the kind and amount of resin will be so chosen as to have little or no adverse effect on the conductivity of the pattern.

Application

The metallizing paste is diluted to a viscosity suitable for dip application (0.5 Pa.S or less). Tantalum capacitor bodies complete with their manganese oxide and graphite coatings are dipped into the paste until the paste covers the entire graphite coating and then the bodies are withdrawn. In the event the shape and size of the bodies result in a large drop of excess paste being left clinging to the bottom of the port, the body may be blotted on a plastic surface to remove excess paste.

The coated body is allowed to stand 30 minutes at room temperature to allow solvents to evaporate. A slightly elevated temperature such as 85°-95° C. may be used instead. Time of heating at this temperature does not appear to be critical.

The final heating step is conducted at a temperature of at least about 200° C. for a time sufficient to effect reaction of at least 50% by wt of the tin with the copper particles to form $Cu_2Sn$. It is preferred that this reaction be carried out at a temperature of at least 220° and preferably 230° C. or higher.

The composition should remain at the elevated temperature long enough for activation of the flux to remove nonconductive oxides from the surfaces of the copper particles and for the tin particles to react with the copper particles, to form coatings of intermetallic copper/tin compound to form around the copper particles. This action must occur at least to the extent that, when the composition is later cooled, the now-coated copper particles are joined in electrically conductive association in a three-dimensional network in a matrix of tin or tin alloy. The specific time of heating will vary with the kind of heating equipment used. Representative heating conditions are, for example, 5 minutes in an oven maintained at 230° C., and 1.5 minutes in an oven set at 335° C. with a flow of nitrogen gas. While not essential, it may be desirable to carry out the heating step in an atmopshere of inert gas, such as nitrogen, to reduce the heat-accelerated formation of nonconductive copper oxide coatings on the surface of the copper particles.

Although formation of the compound $Cu_3Sn$ takes place near the melting point of tin, i.e., 232° C., the compound once formed has a melting point substantially higher than that of tin, as shown, for example, in the phase diagram at page 634 of Hansen, "Constitution of Binary Alloys", McGraw-Hill, New York, 1958. Microscopic and X-ray diffraction analyses of samples of metallizing pastes of this invention after heating show a tin coating of $\epsilon Cu_3Sn$ (m.p. = ~660° C.) immediately surrounding the copper particles. Formation of the intermetallic compounds appears to begin as soon as molten tin flows around the copper particles that have been freshly cleaned of surface oxides by the action of the flux. The copper-rich $\epsilon$ phase forms at the surface of the copper.

Definitions and Test Procedures

A. Capacitance

Capacitance may be defined as the proportionality constant between electric charge and applied voltage ($C=Q/V$).

For a parallel plate condenser, capacitance may be calculated from the formula $$C = KA/4\ d,$$

wherein
K is the dielectric constant,
A is the plate area in $cm^2$
d is the dielectric thickness in cm.
Capacitance by this formula is given in electrostatic units. One farad = $9 \times 10^{11}$ electrostatic units.

Capacitance was measured using a General Radio Automatic RLC Bridge Model 1683 at 120 or 1 KHz frequency and 1 V A.C. Capacitance was generally measured between the anode lead and the soldered cathode coating. In some cases leads were soldered to the cathode and were used for measurements.

B. Dissipation Factor

Dissipation factor is the tangent of the angle ($\delta$) by which the current lags from the 90° vector to the voltage. Here it is expressed as percent dissipation factor ($100 \times$ tangent $\delta$).

The dissipation factor was measured using the same General Radio Automatic Bridge mentioned above for capacitance.

C. Impedance

Impedance is the apparent opposition in an electrical circuit to the flow of an alternating current. It is analogous to the actual electrical resistance with a direct current.

The impedance was measured by determining the voltage drop across the capacitor with a known current through the capacitor. The current was evaluated by measuring the voltage drop across a standard resistor in series with the capacitor. Frequencies of 0.1 to 1 MHz are used in this measurement. The equipment used was a Krohn-Hite 5400A generator with 50 ohm output impedance and a 0-15 V output (peak-to-peak) and a Hewlett-Packard 400E AC voltmeter using the following correlation:

$$Z = (Vm/Vo)(R_s + R_{oI})$$

wherein
$R_s$ = series resistance, ohms
$R_{oI}$ = generator output impedance, ohms
Vo = generator output voltage, volts
Vm = voltage drop across capacitor, volts
Z = Impedance, ohms

D. Solder Acceptance

Solder acceptance is the proportion of the area that is covered by a smooth continuous shiny solder coating.

Better solder acceptance is indicated by a higher proportion of the area being covered by such a coating.

E. Solder Retention Test

This test is used to determine the relative amount of solder powder contained in solder paste which is retained when it is reflowed on a conductor pad.

Procedure

1. Weigh accurately three 1"×1" aluminum substrates on which sixteen 100 mil square pads of Du Pont 8151 microcircuit conductor composition have been printed and fired at 850° C.
2. Screen print the paste of solder powder dispersed in organic vehicle on the conductor pads using an 80 mesh stainless steel-backed screen.
3. Reweigh the three printed substrates to determine how much solder paste was printed.
4. Reflow the solder paste by heating the substrates.
5. Remove the flux and uncoalesced solder from the weighed substrates by immersing them in a beaker of methylene chloride for 30 seconds. Remove the paste and wipe it lightly with a paper towel saturated with methylene chloride.
6. Again reweigh the three substrates to obtain the weight of melted solder powder retained on the conductor pads.
7. Calculate the proportions of solder retained as weight of final reflowed substrates minus the weight of substrates and conductor divided by the weight of substrates plus solder paste minus the initial weight of the substrates and conductor.

Formulation

In the preparation of the composition of the present invention, the particulate solids are mixed with the organic dispersing medium and dispersed with suitable equipment, such as a three-roll mill, to form a suspension, resulting in a composition for which the viscosity will be in the range of about 40–100 pascal-seconds as measured with a Brookfield HBT viscometer, #5 spindle, 10 RPM.

EXAMPLES

Examples 1 to 20—Statistical Matrix

A series of 20 experimental samples was tested in which six compositional processing factors were varied in a statistical fashion. Table I outlines these 6 factors. Factors I to III involve the preparation of a composition:

Factor I
  Condition A:
    Finely divided copper powder of surface area 0.8 to 2 meters sq./gram and bulk density of 2.5 to 3.7 grams/cubic centimeter was used.
  Condition B:
    Copper powder as described above was placed in a 5% sulfuric acid solution at 60° C. for 15 minutes, cooled to room temperature, filtered and washed with distilled water until the washing solution was neutral (pH 7). The resulting powder was then washed twice in methanol and dried in a vacuum for ½ hour.

Factor II:
  This factor involves the ratios by weight of copper powder to solder powder. The copper powder is described above. The solder powder used was of composition 62 wt. % tin, 36 wt. % lead, and 2 wt. % silver. Typical particle size as measured by particle size distribution techniques was as follows: 10% greater than 45 microns, 10% less than 15 microns in size, and 50% of the material was finer than 25 microns in particle size diameter. When the material was passed through a 325 mesh screen, less than 5% of the material was retained on the screen. In the solder retention test greater than 85% by weight of the solder powder was retained.

Factor III:
  This factor involves ratios by weight of resin solution to triethanolamine to butyl acetate solvent. The resin solution was prepared as follows: Equal parts by weight of abietic acid (Hercules Staybelite A-1 resin) were mixed with butyl acetate and heated to 80° to 85° C. with stirring. The suspension was held until the resin was completely dissolved—about one and one-half hours. The resulting solution was cooled to room temperature.

The compositions of Examples 1 to 20 were prepared by dispersing copper, solder powder, resin solution, triethanolamine, and butyl acetate as shown by the Factors I to III in Table II using a Hoover automatic muller[1]. (Hereafter triethanolamine will be denoted by the abbreviation TEA).

[1] Hoover Color Corp., Irvington, N.J.

Factors IV and V involved the coating of tantalum capacitor bodies with the base metal compositions. Tantalum capacitor slugs were obtained from a tantalum capacitor manufacturer (Mallory, Inc., Greencastle, Ind.). These slugs were prepared in the conventional manner, that is, tantalum powder was sintered on a wire in a vacuum. The sintered bodies were anodized in solution to form a coating of tantalum oxide over the tantalum powder. The body was dipped in manganese solutions and heated to give manganese oxide coatings; resulting bodies were dipped in Aquadag[2] and calcined to give graphite coatings. At this stage the bodies are normally dipped in a conductive silver dispersion. In the case of these examples, one body each was dipped in the compositions described in Table II by Factors I, II, III.

[2] 20% aqueous suspension of graphite, Adhesion Colloids Co., Port Huron, MI.

Before dipping, each composition was thinned with butyl acetate to a viscosity suitable for dipping—about 0.5 Pa.S. After dipping the coated bodies were dried at 110° C. for ½ hour and then the coatings were "set" according to Factors IV and V listed in Table I using a circulating air oven.

Factor IV:
  The oven temperature was set at either 205° to 230° C.

Factor V:
  Parts were left in the oven 2 minutes or 4 minutes.

The cured parts were soldered by dipping them in Kester 1429 organic acid flux[3] at room temperature and then into 62% tin, 36% lead, 2% silver solder at 220° C. for 3 seconds. Electrical properties were measured and are summarized in Table III along with a rating of the solder acceptance of each part. Some electrical properties measured on finished capacitors of the same type made by Mallory with a conventional silver dispersion are included for comparison. In the following sections these results are analyzed by property for each factor

[3] Aqueous solution of amino acid hydrochloride, Kester Solder Div., Litton Industries, Chicago, IL.

Capacitance values are not influenced by the outer cathode coating but are largely a function of tantalum metal powder surface area and the thickness of the oxide coating. Therefore, no analysis was made using these data.

Dissipation factor data measured at one kilohertz are most influenced by the outer cathode coating, although 120 hertz frequency data is generally used for performance specifications for tantalum capacitors. Therefore one kilohertz frequency data were used to select the best conditions in this matrix of experiments. At either frequency the lowest dissipation factor values possible are desired. Table IV summarizes the effects of factors on dissipation factor at one kilohertz frequency. The following conclusions are drawn by referring to Table IV in combination with Table I. Untreated copper powder gave a lower dissipation factor than washed copper powder. The ratio of copper to solder powder had little effect on dissipation factor. A lower proportion of resin (I) gives the lowest DF values. A high proportion of resin (H and K) gives the highest DF values. A lower ratio of TEA to resin (I versus J) gives the lowest dissipation factors. 230° C. heating gives lower dissipation factors than 205° C. heating. Four-minute setting time is predominant among coatings giving low DF values.

Low values of impedance at the minimum resonant frequency of one megahertz are desired. The effects of the different factor conditions on impedance are summarized in Table V. Again, unwashed copper powder gives the best results, that is, lower impedance. Here also, the ratio of copper to solder metal powders has little effect. Again, low resin content with low TEA content (I) gives the lowest impedance. High resin with high TEA (H) gives the highest impedance. 230° C. heating is better than 205° C. heating. A four-minute heating time is clearly better than two-minutes.

Solder Acceptance: The effect of the factor conditions on solder acceptance are summarized in Table VI.

Acid washed copper powder gives better results than unwashed powder. High copper contents (D) are better than low copper to solder powder ratios (G). High resin and TEA contents are best. The temperature of heating is not important. Longer heating times appear to hurt solderability-apparently due to oxidation.

Summary: The overall best composition and process conditions were selected as follows based on Examples 1 to 20. The electrical properties, dissipation factor, and impedance were considered most important. The solder acceptance was used to select the best conditions where these conditions had no effect on electrical properties as long as the resulting conditions gave acceptable soldering.

Factor I:
  It is preferable to use unwashed copper powder.
Factor II:
  Higher copper contents, as in Conditions D, E, or F, are preferable.
Factor III:
  Low resin and TEA contents as in Condition I are preferred.
Factor IV:
  230° C. heating is optimum.
Factor V:
  4-minute heating is best overall.

Examples 21A to E-Effects of Dilution

Example 21 was made by dispersing 80 parts of unwashed copper powder and 20 parts of solder powder with 5.9 parts resin solution (3.0 parts resin), 2.9 parts TEA and 8.8 parts beta terpineol using a roll mill. The same materials were used as for Examples 1 to 20. The composition is the same as that of Example 11 except that beta terpineol is used in place of butyl acetate as the separate solvent. Example 21 was then diluted with various proportions of butyl acetate as shown in Table VII. Parts as described above were dipped in the composition, diluted to various extents and processed in the manner of Examples 1 to 20 with 3 minutes heating at 230° C. Optimum properties were achieved when 80 parts of Example 21 were diluted with 20 parts of butyl acetate.

Example 22-Variation in Composition Preparation

A medium was made with equal weights of Hercules Stabelite A-1 resin, TEA and beta terpineol. The beta terpineol was heated to 60°-70° C. and then the resin was added gradually with stirring. The suspension was heated until all resin was dissolved and then the TEA was added and the solution was cooled to room temperature.

A composition was then prepared by dispersing 80 parts of unwashed copper powder and 20 parts solder powder (both described in Examples 1 to 20) in 8.82 parts of the above medium and 8.82 parts beta terpineol using the roll mill. The resulting resin and TEA contents were 2.9 parts and the final beta terpineol content was 8.8 parts.

Table VIII summarizes the data measured using tantalum capacitor slugs from another manufacturer coated with the composition of Example 22 and a 43% wt. silver dispersion. Example 22 was diluted to two different extents designated Examples 22A and 22B in the Table. Six parts were dipped in each diluted composition. Parts were dried 45 minutes at room temperature and then "set" 5 minutes at 230° C. in a circulating air oven. Finally, they were soldered in 62% tin, 36% lead, 2% silver solder at 230° C. for 5 seconds using Kester 1429 flux.

As a control six parts were dipped in silver dispersion and dried for 30 minutes at 150° C. These parts were then soldered in 62% tin, 36% lead, 2% silver solder at 200° C. for 3 seconds using Alpha 100 nonactivated flux[4]. This is a standard procedure for coating tantalum capacitors with a polymer silver composition as anode coating.

(4) Alpha Metals, Inc., Jersey City, N.J.

The average values for the electrical properties summarized in Table VIII indicate that Example 22A (80/20 solution) gave the best electrical properties, and these are close to those measured for silver dispersion. Solder acceptance was excellent for both Examples 22A and B and better than that for the normally used 43% wt. silver polymer composition. Thus, these variations in processing give as good results as those used in Examples 1 to 20 or Example 21.

Example 23-Environmental Tests

A composition was prepared in the same manner as Example 22 except that "Cellosolve" acetate[5] was used as solvent for the medium only. This time two types of parts from a third tantalum capacitor manufacturer were coated and soldered as in Example 22. Higher capacitance samples were selected to emphasize the effect of higher electrical resistance, which tends to yield higher DF and impedance. The composition of Example 23 was diluted 80 parts composition to 20 parts butyl acetate and another dilution was made of 90 parts of composition with 10 parts of butyl acetate. This time a Du Pont silver dispersion containing 50% silver with butyl acetate diluent was used as a control. The silver coating processing was carried out using the standard techniques described in Example 22. Again, the Example 23 base metal coating showed better solderability than the one derived from the standard silver dispersion.

(5) Trade name of Union Carbide Corp. for ethylene glycol monoethyl ether acetate.

Directly after soldering, parts were dipped in the customer's proprietary thermal setting epoxy coating and cured. Such coatings are standard in the tantalum capacitor industry.

These finished encapsulated parts were then divided into two groups. One group was subjected to the standard thermal cycling test of the industry, that is, seven cycles from −55° C. to +125° C. with ½ hour exposure at each each temperature and a 10 second transfer time. Average values for dissipation factor and impedance were measured before and after the thermal cycling and are summarized in Table IX. Although the initial dissipation factor and impedance values for Examples 23 base metal conductor coating were higher than those for the conventional silver coating, these initial values were considered acceptable by the capacitor manufacturer. Conductive coating defects are amplified at 1 kilohertz frequency, but the dissipation factor specifications for tantalum capacitors are set at 120 hertz. Changes during thermal cycling were considered insignificant for either Example 23 base metal coating or the conventionally silver coated parts. Again, less diluted composition (90/10) gave higher dissipation factor and impedance values because of the greater coating thickness and therefore longer path length for AC electrical current flow through the capacitor.

The second group of encapsulated parts was subjected to a "pressure cooker" test. This test involves heating the parts for eight hours at 120° C. at 100% relative humidity and two atmospheres pressure. For silver coatings this test gives more severe degradation than the normal 1000 hour exposure at 40° C. and 95% relative humidity that is standard in the industry. Table X summarizes average DF and impedance values measured before and after this test. Here, much more severe degradation occurred for Example 23 base metal conductive coating than for the conventional silver coating. It is of interest that the thicker 90/10 coating showed less degradation, however. This indicates that diffusion of oxygen through the coating, thus causing oxidation of the copper tin coating, was responsible for the increase in dissipation factor and impedance.

Two possible methods are available to reduce such degradation: (1) Parts may be hermetically sealed, which is the standard technique in the tantalum capacitor industry; or (2) A denser coating may be obtained by heating the base metal conductive coating at higher temperatures than 230° C. under flowing inert gas.

Example 24-SEM and X-Ray Diffraction Analysis Of the Base Metal Conductor Coating A composition was prepared as in Example 22 and diluted to 80 parts of composition and 20 parts of butyl acetate. A glass slide was dipped in this material and dried 45 minutes at room temperature. It was then heated 5 minutes at 230° C. in the same manner as when the coatings are set on the tantalum capacitor slugs. The resulting coatings were analyzed by X-ray diffraction techniques. The major phase was copper metal with intermetallic compound $Cu_3Sn$ and lead metal also detected. Most of the tin appeared to be tied up in the intermetallic compound $Cu_3Sn$.

Tantalum capacitor slugs were coated with the composition of Example 24 set and soldered as in Example 23. Scanning electron microscope (SEM) and element distribution studies indicate a copper-rich layer of about 30 micron thickness in close contact to the manganese layer. The graphite layer is not detectable in such analysis. Based on the above X-ray diffraction analysis, the copper layer presumably consists of copper particles coated with $Cu_3Sn$. Over this layer was a 6-10 microns thick tin-rich layer containing lead concentrated in the outermost half thickness. Thus the coating over the manganese and graphite on the tantalum log capacitor was principally metallic in nature.

Examples 25 to 30-Effects of Reducing Resin and TEA Contents

Compositions were prepared in the manner of Example 22 except that lower resin and TEA contents were used. 80 Parts of copper powder were mixed with 20 parts of 62% tin, 36% lead, 2% silver solder powders. For 100 parts of metal powders the quantities in parts by weight of resin and TEA are shown in Table XI. The examples with the lower resin contents could not be diluted as much as those with the higher content because the powder settling rates became too fast. The dilution ratios of composition to butyl acetate are shown in the Table. Again, the diluted compositions were coated on tantalum capacitor bodies, "set" 5 minutes at 230° C. and soldered in 62% tin, 36% lead, 2% silver solder, 220° C. using Kester 1429 flux. Measured electrical properties are summarized in Table XI.

In general, lowering the resin and TEA contents within these limits relative to the metal content did not hurt the electrical properties. However, lower resin contents gave lower viscosities at a given dilution ratio and therefore these compositions were applied at a less diluted state. The resulting thicker metal layers may have given higher resistance and therefore compensated for beneficial effects of having less insulating resin present. Therefore, using less resin or TEA than those of Example 25 seems of no obvious benefit.

Examples 31 to 33-Use of Partially Hydrogenated Abietic Acid

In all the work described above unsaturated abietic acid (Hercules Staybelite A-1) was used as resin. In this series of experiments partially hydrogenated abietic acid was tried to see if higher conductivity and improved electrical properties might result. In these cases stoichiometric amounts of TEA were used with the resin as in Examples 28 to 30 above.

Example 31 was prepared as a control with the unsaturated abietic acid (Hercules Staybelite A-1) and the sample prepared as in Example 22.

Example 32 was prepared with the same metal content as Example 31 but with 3.0 parts Hercules Pentalyn 856 resin (partially hydrogenated abietic acid) and 1.2 parts TEA. Example 33 was prepared as for Example 31 except with 3.0 parts Hercules Pentalyn 255 resin (partially hydrogenated abietic acid).

All compositions were diluted in proportion 80 parts composition with 20 parts butyl acetate. Six tantalum capacitor slugs were dipped in each composition and "set" 5 minutes at 230° C. Samples were soldered as in previous examples. The resulting properties including average electrical measurements are summarized in Table XII. The data indicate comparable effectiveness in using partially hydrogenated abietic acid in place of the completely unsaturated acid.

TABLE 1

EXAMPLES 1 TO 20
DESCRIPTION OF CONDITIONS

| Factor | Condition Code | Description |
|---|---|---|
| I | A | Untreated copper powder |
|  | B | Acid-washed copper powder |
| II | C | 50 parts Cu powder/50 parts solder powder |
|  | D | 90 parts Cu powder/10 parts solder powder |
|  | E | 80 parts Cu powder/20 parts solder powder |
|  | F | 70 parts Cu powder/30 parts solder powder |
|  | G | 60 parts Cu powder/40 parts solder powder |
| III | H | 11.8 parts resin solution*/5.9 parts TEA/9.4 parts butyl acetate |
|  | I | 5.9 parts resin solution*/2.9 parts TEA/18.2 parts butyl acetate |
|  | J | 5.9 parts resin solution*/5.9 parts TEA/15.3 parts butyl acetate |
|  | K | 11.8 parts resin solution*/2.9 parts TEA/12.3 parts butyl acetate |
| IV | L | 205° C. setting temperature |
|  | M | 230° C. setting temperature |
| V | N | 2 min. setting time |

TABLE 1-continued

EXAMPLES 1 TO 20
DESCRIPTION OF CONDITIONS

| Factor | Condition Code | Description |
|---|---|---|
| | O | 4 min. setting time |

*11.8 parts solution equiv. to 5.9 parts resin 5.9 parts solution equiv. to 3.0 parts resin.

TABLE II

EXAMPLES 1 to 20 - CONDITIONS

| | Compositional Variables | | | Process Variables | |
|---|---|---|---|---|---|
| Factor | I | II | III | IV | V |
| Example No. | | | | | |
| 1 | B | E | I | H | O |
| 2 | B | C | K | L | O |
| 3 | B | F | H | L | O |
| 4 | B | D | H | M | N |
| 5 | B | D | H | L | N |
| 6 | A | G | J | M | N |
| 7 | B | C | H | L | N |
| 8 | A | C | J | M | O |
| 9 | B | E | H | M | O |
| 10 | A | E | H | L | N |
| 11 | A | E | I | M | N |
| 12 | B | G | K | L | O |
| 13 | B | E | H | M | O |
| 14 | A | G | I | M | O |
| 15 | A | D | J | M | O |
| 16 | A | E | H | M | N |
| 17 | B | F | K | M | N |
| 18 | A | C | I | M | O |
| 19 | B | G | I | M | O |
| 20 | A | F | K | L | N |

TABLE III

EXAMPLES 1 to 20 RESULTS

| Ex. | Cap. (nF) 120 HZ | DF (%) | DF (%) 1 KHZ | Imp (Ω) (MHZ) | Solder Acceptance |
|---|---|---|---|---|---|
| 1 | 12.6 | 3.0 | 6.3 | 0.2 | Good |
| 2 | 13.4 | 10.1 | 31.8 | 0.9 | Fair |
| 3 | 14.8 | 9.9 | 66.3 | 2.0 | Good |
| 4 | 15.1 | 7.7 | 50.0 | 1.6 | V. Good |
| 5 | 14.2 | 13.2 | 86.8 | 2.8 | V. Good |
| 6 | 11.7 | 5.5 | 26.0 | 1.2 | Good |
| 7 | 12.2 | 7.7 | 57.7 | 1.9 | Fair |
| 8 | 11.6 | 4.5 | 18.5 | 0.6 | Fair |
| 9 | 13.1 | 6.1 | 35.0 | 1.3 | Fair |
| 10 | 11.6 | 10.1 | 76.5 | 2.7 | Good |
| 11 | 11.0 | 3.8 | 15.1 | 0.7 | Good |
| 12 | 12.2 | 3.8 | — | 0.9 | Poor |
| 13 | 11.5 | 2.8 | 13.7 | 0.6 | Fair |
| 14 | 11.7 | 1.5 | 6.4 | 0.3 | Poor |
| 15 | 12.4 | 2.2 | 9.0 | 0.4 | Good |
| 16 | 11.7 | 3.9 | 21.5 | 0.8 | Good |
| 17 | 12.3 | 4.1 | 21.0 | 0.8 | Good |
| 18 | 11.9 | 1.5 | 5.9 | 0.3 | Fair |
| 19 | 11.9 | — | — | 0.3 | Poor |
| 20 | 12.2 | 1.9 | 6.9 | 0.3 | Good |
| Commercial Ag coated capacitors | | | | | |
| 15 | 2.5 | 8.0 | 0.4 | | |

TABLE IV

EFFECT OF FACTORS ON DF (1 KHZ)

| Ex. | I | II | III | IV | V | DF (%) |
|---|---|---|---|---|---|---|
| Lowest DF Values | | | | | | |
| 1 | B | E | I | M | O | 6.3 |
| 14 | A | G | I | M | O | 6.4 |
| 18 | A | C | I | M | O | 5.9 |
| 20 | A | F | K | L | N | 6.9 |
| Highest DF Values | | | | | | |
| 5 | B | D | H | L | N | 86.8 |
| 10 | A | E | H | L | N | 76.5 |
| 12 | B | G | K | L | O | immeasurable |
| 19 | B | G | I | M | O | immeasurable |

TABLE V

EFFECT OF FACTORS ON IMPEDANCE

| Ex. | I | II | III | IV | V | Imp (Ω) |
|---|---|---|---|---|---|---|
| Lowest impedance | | | | | | 1 MHZ |
| 1 | B | E | I | M | O | 0.2 |
| 14 | A | G | I | M | O | 0.3 |
| 18 | A | C | I | M | O | 0.3 |
| 20 | A | F | K | L | N | 0.3 |
| Highest impedance | | | | | | |
| 3 | B | F | H | L | O | 2.0 |
| 5 | B | D | H | L | N | 2.8 |
| 10 | A | E | H | L | N | 2.7 |
| 7 | B | C | H | L | N | 1.9 |

TABLE VI

EFFECT OF FACTORS ON SOLDER ACCEPTANCE

| Ex. | I | II | III | IV | V | Solder Acceptance |
|---|---|---|---|---|---|---|
| Best Solderability | | | | | | |
| 4 | B | D | H | M | O | V. Good |
| 5 | B | D | H | L | N | V. Good |
| Worst Solderability | | | | | | |
| 12 | B | G | K | L | O | Poor |
| 14 | A | G | I | M | O | Poor |
| 19 | B | G | I | M | O | Poor |

TABLE VII

EFFECT OF DILUTION

| Ex. | Wt. % Example 21* | Wt. % Butyl Acetate | Result |
|---|---|---|---|
| 21A | 83.3 | 16.7 | High DF |
| B | 80 | 20 | Good solder acceptance and low DF |
| C | 72.7 | 27.3 | Poor solder acceptance |
| D | 66.7 | 33.3 | Too thin |
| E | 50 | 50 | Much too thin |

*Composition of Example 21 formulation: 80 pts. Cu, 20 pts solder, 5.9 pts. resin solution, 2.9 pts TEA, and 8.8 pts. β-terpineol/

TABLE VIII

VARIATION IN COMPOSITION PREPARATION

| Ex. | Wt. % Ex. 22 | Wt. % But. Acet. | Visc. (Pa.S) | Cap (nF) | DF (%) | Imp. (Ω) | Solder Acceptance |
|---|---|---|---|---|---|---|---|
| | | | | 1 KHZ | | 1 MHZ | |
| 22A | 80 | 20 | 0.12 | 643 | 0.96 | 0.51 | Good |
| 22B | 85 | 15 | 0.32 | 654 | 1.75 | 0.97 | Good |
| (2) | — | — | | 660 | 0.81 | 0.39 | Fair |

(1) Brookfield Viscometer, Instrument LVT Spindle #2, 60 RPM, 25° C.
(2) Conventional dispersion of silver powder dispersed in solution of acrylic polymer, ethylene glycol monoethyl ether acetate and volatile solvent. 43% wt. Ag.

TABLE IX

EXAMPLE 23
ELECTRICAL PROPERTIES BEFORE AND AFTER THERMAL CYCLING

| Comp. | Dilution | DF (%) 120 HZ Initial | DF (%) 120 HZ Final | DF (%) 1 KHZ Initial | DF (%) 1 KHZ Final | Imp. (Ω) 10 KHZ Initial | Imp. (Ω) 10 KHZ Final |
|---|---|---|---|---|---|---|---|
| *TYPE A 47 μF/6.3 V* | | | | | | | |
| Ex. 23 | 80/20 | 6.7 | 6.9 | 41.6 | 52.3 | 1.5 | 1.9 |
| (1) | 50% Ag | 2.4 | 2.0 | 10.5 | 11.6 | .4 | .4 |
| *TYPE B 33 μF/100 V* | | | | | | | |
| Ex. 23 | 80/20 | 14.6 | 17.5 | 108.3 | 136.4 | 5.0 | 6.4 |
| Ex. 23 | 90/10 | 24.9 | 29.2 | 192.9 | 229.2 | 8.7 | 10.4 |
| (1) | 50% Ag | 4.0 | 4.5 | 23.8 | 28.8 | 1.0 | 1.2 |

(1) Conventional dispersion of silver powder dispersed in solution of ethylene glycol monoethyl ether acetate diluted with volatile solvent to 50% Ag.

TABLE X

EXAMPLE 23 (continued)
ELECTRICAL PROPERTIES BEFORE AND AFTER PRESSURE COOKER TEST

| Comp. | Dilution | DF (%) 120 HZ Initial | DF (%) 120 HZ Final | DF (%) 1 KHZ Initial | DF (%) 1 KHZ Final | Imp. (Ω) 10 KHZ Initial | Imp. (Ω) 10 KHZ Final |
|---|---|---|---|---|---|---|---|
| *TYPE A 47 μF/6.3 V* | | | | | | | |
| Ex. 23 | 80/20 | 6.5 | 192.8 | 45.3 | 856.6 | 1.6 | 47.6 |
|  | 50% Ag | 2.3 | 4.3 | 10.1 | 31.2 | .4 | .9 |
| *TYPE B 33 μF/100 V* | | | | | | | |
| Ex. 23 | 80/20 | 9.4 | 218.3 | 68.3 | 713.8 | 3.1 | 79.2 |
| Ex. 23 | 90/10 | 19.7 | 116.8 | 150.1 | 732.6 | 6.8 | 40.4 |
|  | 50% Ag | 3.8 | 20.9 | 21.5 | 157.1 | .8 | 6.5 |

TABLE XI

EFFECTS OF REDUCING RESIN AND TEA CONTENTS

| Ex. | Parts Resin | Parts TEA | Dil'n* | Visc. (Pa · S) | DF (%) 1 KHZ | Imp. (Ω) 1 MHZ |
|---|---|---|---|---|---|---|
| 25 | 3.0 | 2.9 | 80/20 | 0.10 | 2.02 | 0.64 |
| 26 | 2.2 | 2.2 | 85/15 | 0.12 | 2.40 | 0.63 |
| 27A | 1.5 | 1.5 | 90/10 | 0.25 | 2.82 | 0.93 |
| 27B | 1.5 | 1.5 | 85/15 | 0.18 | 2.70 | 0.71 |
| 28 | 3.0 | 1.5 | 90/10 | 0.15 | 1.58 | 0.81 |
| 29 | 2.2 | 1.1 | 90/10 | 0.10 | 2.80 | 0.63 |
| 30 | 1.5 | 0.8 | 90/10 | 0.11 | 2.36 | 0.65 |
| (1) |  |  |  |  | 1.38 | 0.38 |

*Ratio of compositions to solvent
(1) Conventional dispersion of silver powder dispersed in solution of ethylene glycol monoethyl ether acetate and volatile solvent 43% wt. Ag.

TABLE XII

USE OF PARTIALLY HYDROGENATED ABIETIC ACID

| Ex. | Resin | Visc. (Pa S) | DF (%) 1 KHZ | Imp. (Ω) 1 MHZ | Solder Accept. |
|---|---|---|---|---|---|
| 31 | Staybelite A-1 | 0.10 | 1.69 | 0.34 | Fair |
| 32 | Pentalyn 856 | 0.17 | 3.46 | 0.47 | Good |
| 33 | Pentalyn 255 | 0.10 | 5.47 | 0.50 | Fair |
| (1) |  |  | 1.71 | 0.22 | Good |

(1) Conventional dispersion of silver powder dispersed in solution of ethylene glycol monoethyl ether acetate and volatile solvent. 43% wt. Ag.
(2) Same as (1), 50% Ag.

We claim:

1. A metallizing composition for use as a capacitor cathode coating comprising (a) 92–97% by weight of a mixture of 70–95% weight finely divided particles of copper and 30–35% wt. finely divided particles of tin-containing metal, dispersed in a solution of (b) 4–1.5% by wt. of an organic acid flux having an acid number of at least 100 and which is thermally stable to a temperature of at least 230° C., and (c) 4–1.5% by wt. of an organic amine corresponding to the formula

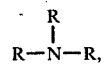

wherein R is independently selected from the group consisting of H, $C_{1-8}$ alkyl, $C_{2-4}$ alkenyl and $C_{1-4}$ hydroxy alkyl, at least one of the R groups being alkyl or hydroxyalkyl in (d) an inert organic medium the total amount of resin in the composition being no greater than 4% by wt.

2. The composition of claim 1 in which the organic acid flux is rosin-derived.

3. The composition of claim 2 in which the organic acid flux is hydrogenated or nonhydrogenated abietic acid.

4. The composition of claim 1 in which the organic acid is a saturated or unsaturated long chain fatty acid.

5. The composition of claim 1 in which the organic amine is a polyalkanolamine.

6. The composition of claim 5 in which the polyalkanolamine is triethanol amine.

7. The composition of any of claims 1–6 which contains 75–90% wt. copper, 25–10% wt. tin, 2.5–3.5% organic acid flux and 2.5–3.5% organic amine.

* * * * *

UNITED STATES PATENT OFFICE
CERTIFICATE OF CORRECTION

PATENT NO. : 4,434,084

DATED : February 28, 1984

INVENTOR(S) : William T. Hicks and William C. Seidel

It is certified that error appears in the above-identified patent and that said Letters Patent are hereby corrected as shown below:

In Column 16, line 27, the number "35%" should be -- 5% --.

Signed and Sealed this

Fifteenth Day of May 1984

[SEAL]

Attest:

GERALD J. MOSSINGHOFF

Attesting Officer

Commissioner of Patents and Trademarks